United States Patent
Zhan et al.

(10) Patent No.: US 8,804,383 B2
(45) Date of Patent: Aug. 12, 2014

(54) STARTER OF GRID-CONNECTED INVERTER AND CONTROL METHOD THEREOF

(75) Inventors: Wen-Tao Zhan, Taoyuan Hsien (TW); Liang Li, Taoyuan Hsien (TW); Hong-Yang Wu, Taoyuan Hsien (TW); Heng Huang, Taoyuan Hsien (TW); Bin Wang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 182 days.

(21) Appl. No.: 13/544,821

(22) Filed: Jul. 9, 2012

(65) Prior Publication Data
US 2013/0235629 A1    Sep. 12, 2013

(30) Foreign Application Priority Data
Mar. 9, 2012 (CN) .......................... 2012 1 0066908

(51) Int. Cl.
*H02M 1/14*    (2006.01)

(52) U.S. Cl.
USPC ................. 363/49; 363/50; 323/901; 323/908

(58) Field of Classification Search
CPC ......... H02H 9/00; H02H 7/125; H02H 9/001; H02M 7/797; H02M 1/125; H02M 1/36
USPC ............................... 363/49, 50; 323/901, 908
See application file for complete search history.

(56) References Cited

U.S. PATENT DOCUMENTS

| | | | |
|---|---|---|---|
| 4,625,271 A | 11/1986 | Chetty et al. | |
| 5,282,125 A | 1/1994 | Dhyanchand et al. | |
| 5,627,738 A * | 5/1997 | Lubomirsky et al. | 363/49 |
| 5,995,394 A * | 11/1999 | Svensson et al. | 363/51 |
| 6,009,008 A * | 12/1999 | Pelly | 363/125 |
| 6,744,644 B2 | 6/2004 | Kojori | |
| 6,781,342 B2 * | 8/2004 | Tolbert et al. | 318/784 |
| 7,746,318 B2 | 6/2010 | Shin et al. | |

(Continued)

FOREIGN PATENT DOCUMENTS

| | | |
|---|---|---|
| CA | 2228397 C | 4/1999 |
| CN | 201219243 Y | 4/2009 |

(Continued)

OTHER PUBLICATIONS

Geng et al., Soft Start-Up Technique for Large Power Shunt Active Power Filter, Telecom Power Technologies, Jan. 25, 2006, vol. 23, No. 1, pp. 12-15.

*Primary Examiner* — Bao Q Vu
(74) *Attorney, Agent, or Firm* — CKC & Partners Co., Ltd.

(57) ABSTRACT

A starter of the grid-connected inverter and a control method thereof are disclosed. The starter comprises a controller, and a first switch and a first resistor connected in parallel. The controller includes an input end, and first and second output ends. The input end inspects the DC voltage signal from the inverter. When the DC voltage exceeds a predetermined voltage threshold, the first output end sends a first control signal to turn on the first switch, and the second output end sends a second control signal to make the grid-connected inverter enter into a chopping mode. There is a delay period between the send time of the first control signal and that of the second control signal.

28 Claims, 9 Drawing Sheets

(56) References Cited

U.S. PATENT DOCUMENTS

| | | |
|---|---|---|
| 7,755,298 B2 | 7/2010 | Liu et al. |
| 7,791,847 B2 | 9/2010 | Chen |
| 7,906,945 B2 | 3/2011 | Kao et al. |
| 7,936,137 B2 | 5/2011 | Imanaka et al. |
| 8,044,604 B2 | 10/2011 | Hagino et al. |
| 2009/0273953 A1 | 11/2009 | Zhao et al. |

FOREIGN PATENT DOCUMENTS

| | | |
|---|---|---|
| CN | 101685975 A | 3/2010 |
| CN | 101771339 A | 7/2010 |
| CN | 101931248 A | 12/2010 |
| EP | 0911951 A1 | 4/1999 |
| JP | 7-298660 | 11/1995 |
| JP | 11-235048 | 8/1999 |
| JP | 2001-086741 A | 3/2001 |
| JP | 2008-299554 A | 12/2008 |
| JP | 2011-240441 A | 12/2011 |
| KR | 1020080114309 A | 12/2008 |
| KR | 1020090012511 A | 2/2009 |
| KR | 1020100123335 A | 11/2010 |
| SE | 510482 C2 | 5/1999 |
| TW | 200922100 | 5/2009 |
| TW | I347736 | 8/2011 |
| WO | 9323916 | 11/1993 |

\* cited by examiner

STARTER OF GRID-CONNECTED INVERTER AND CONTROL METHOD THEREOF

RELATED APPLICATIONS

This application claims priority to Chinese Application Serial Number 201210066908.3, filed Mar. 9, 2012, which is herein incorporated by reference.

BACKGROUND

1. Field of Invention

The present disclosure relates to a grid-connected inverter. More particularly, the present disclosure relates to a starter of a grid-connected inverter and a control method thereof.

2. Description of Related Art

With the ever-increasing seriousness of energy-related problems in recent times, the development of new ways in which to generate energy (e.g., wind energy, solar energy, etc.) is attracting the attention of those involved in research and development in various fields. In a power generation system, the frequency and phase of the AC (alternating current) voltage outputted by the power generator are often different from those of the AC electric grid. Thus, the AC voltage outputted by the power generator is generally converted into a DC (direct current) voltage through an inverter (or a converter), and subsequently the DC voltage is inverted to another AC voltage having the same frequency and phase as the AC electric grid, so as to realize grid-connected power generation. In the process of converting the AC voltage into the DC voltage and subsequently inverting the DC voltage into another AC voltage, electronic components (e.g., power switching valves) are PWM (pulse-width modulation)-controlled, and the AC-DC conversion and DC-AC conversion are realized by turning on or off these power switching valves.

Furthermore, as such electronic components are widely applied, the problem of harmonic waves and asymmetry of the power system is becoming more and more serious, and this is greatly harmful to the operation safety, stability and reliability of the grid-connected inverter mentioned above. As a result, it becomes necessary to suppress the harmonic waves and perform harmonic compensation. One solution of the prior art involves using an active power filter (APF) to realize harmonic compensation. However, in such an APF, the inductance at the AC side is often small, and only a filter capacitor is arranged at the DC side. Thus if the APF is incorporated into an AC electric grid without a soft start process, a large start-up inrush current will be generated, which greatly threatens the safety of the power components, and may even cause failure of the APF grid connection.

In view of this, many in the industry are endeavoring to find ways in which to design a starter of a grid-connected inverter and reasonably control the starter, so as to minimize the inrush current during start-up of the grid-connected inverter while avoiding increases in the capacity and cost of the system, and also so as to protect the power switch components and incorporate the inverter into the electric grid through a soft start process.

SUMMARY

In order to overcome the prior art disadvantages associated with when a grid-connected inverter is connected with an AC electric grid, a starter of a grid-connected inverter and a control method thereof is provided.

An aspect of the present disclosure is related to a starter of a grid-connected inverter. The starter includes a first switch and a first resistor connected in parallel. The first switch is electrically connected between an AC electric grid and the grid-connected inverter. The starter further includes a controller. The controller includes an input end, a first output end and a second output end. The input end of the controller receives and inspects the DC voltage of an inverter. When the DC voltage exceeds a predetermined voltage threshold, the first output end of the controller sends a first control signal to turn on the first switch, and the second output end sends a second control signal to make the grid-connected inverter enter into the chopping mode. There is a delay period td1 between the send time of the first control signal and that of the second control signal, and td1 is larger than 0.

In an embodiment, the second control signal is a PWM enable signal, and the PWM enable signal makes the grid-connected inverter enter into a boost mode. The send time of the second control signal is any time in the period from the time point T/24 before the zero-crossing point of the phase voltage of the electric grid to the time point T/24 after the zero-crossing point of the phase voltage. T is a power frequency cycle. Furthermore, the send time of the second control signal is the zero-crossing point of the phase voltage of the electric grid.

In an embodiment, the starter further includes a second switch connected in series with the first resistor. The controller further includes a third output end, and the third output end outputs a third control signal to turn on or off the second switch. At the send time of the first control signal, the second switch is still turned on based on the third control signal having a first level. At the send time of the second control signal, the second switch is turned off based on the third control signal having a second level. There is a delay period td2 between the send time of the third control signal having the second level and the send time of the second control signal. td2 is larger than 0 and smaller than td1.

In an embodiment, the send time of the first control signal is any time in the time period from the time point T/12 before the zero-crossing point of the phase voltage of the electric grid to the time point T/12 after the zero-crossing point of the phase voltage, and T is the power frequency cycle. In some embodiments, the send time of the first control signal is the zero-crossing point of the phase voltage of the electric grid.

In an embodiment, the send time of the first control signal is any time in the time period from the time point (T/12+tc) before the zero-crossing point of the phase voltage of the electric grid to the time point (T/12+tc) after the zero-crossing point of the phase voltage. T is the power frequency cycle, and tc is the operation time of the first switch.

The starter further includes a knife switch arranged between the first switch and the AC electric grid.

Furthermore, the predetermined voltage threshold is 0.8 times the line voltage peak value of the AC electric grid.

Another aspect of the present disclosure is related to a starter of a grid-connected inverter. The starter includes a first switch, a precharge branch circuit and a controller. The first switch is electrically connected between an AC electric grid and the grid-connected inverter. The precharge branch circuit is connected with the first switch in parallel, and the precharge branch circuit includes a second switch and a first resistor connected in series. The controller includes an input end, a first output end and a second output end. The input end of the controller receives and inspects the DC voltage of the inverter. When the DC voltage exceeds a predetermined voltage threshold, the first output end of the controller sends a first control signal to turn on the first switch, and the second output end outputs a second control signal to turn on or off the second switch. There is a delay period td3 between the send time of the second control signal having a first level and the send time of the first control signal, and td3 is larger than 0.

In an embodiment, at the send time of the first control signal, the second switch is still turned on based on the second control signal having a second level. The first level is a low level and is used to turn off the second switch. The second level is a high level and is used to turn on the second switch.

In an embodiment, the send time of the first control signal is any time in the time period from the time point T/12 before the zero-crossing point of the phase voltage of the electric grid to the time point T/12 after the zero-crossing point of the phase voltage, and T is the power frequency cycle. In some embodiments, the send time of the first control signal is the zero-crossing point of the phase voltage of the electric grid.

In an embodiment, the send time of the first control signal is any time in the time period from the time point (T/12+tc) before the zero-crossing point of the phase voltage of the electric grid to the time point (T/12+tc) after the zero-crossing point of the phase voltage. T is the power frequency cycle, and tc is the operation time of the first switch.

Furthermore, the predetermined voltage threshold is 0.8 times the line voltage peak value of the AC electric grid.

A further aspect of the present disclosure is related to a control method of a starter. The starter includes a first switch and a first resistor connected in parallel. The first switch is electrically connected between an AC electric grid and a grid-connected inverter. The control method includes inspecting a DC voltage of the grid-connected inverter, sending a first control signal to turn on the first switch when the DC voltage exceeds a predetermined voltage threshold, performing a delay for a time period td1 which is larger than zero, and sending a second control signal to make the grid-connected inverter enter into a boost mode.

In an embodiment, the time period td1 is not smaller than the operation time used for completely turning on the first switch.

In an embodiment, the send time of the second control signal is any time in the time period from the time point T/24 before the zero-crossing point of the phase voltage of the electric grid to the time point T/24 after the zero-crossing point of the phase voltage, and T is the power frequency cycle.

In another embodiment, the send time of the first control signal is any time in the time period from the time point T/12 before the zero-crossing point of the phase voltage of the electric grid to the time point T/12 after the zero-crossing point of the phase voltage, and T is the power frequency cycle.

Furthermore, the predetermined voltage threshold is 0.8 times the line voltage peak value of the AC electric grid.

Still a further aspect of the present disclosure is related to a control method of a starter. The starter includes a first switch and a precharge branch circuit connected in parallel. The first switch is electrically connected between an AC electric grid and a grid-connected inverter. The precharge branch circuit includes a second switch and a first resistor connected in series. The control method includes inspecting the DC voltage of the grid-connected inverter, sending a first control signal to turn on the first switch when the DC voltage exceeds a predetermined voltage threshold, performing a delay for a time period td4 which is larger than zero, and sending a second control signal having a first level to turn off the second switch.

In an embodiment, before performing the step of sending the first control signal, the control method further includes sending a second control signal having a second level to turn on the second switch, so that a DC bus capacitor at the DC side of the inverter is in a precharge state.

In another embodiment, the send time of the first control signal is any time in the time period from the time point T/12 before the zero-crossing point of the phase voltage of the electric grid to the time point T/12 after the zero-crossing point of the phase voltage, and T is the power frequency cycle.

Furthermore, the predetermined voltage threshold is 0.8 times the line voltage peak value of the AC electric grid.

By adopting the starter of the grid-connected inverter and the control method thereof, the controller of the starter sends a first control signal to turn on a main loop switch, and after a delay period the controller sends a second control signal to make the grid-connected inverter enter into a chopping mode, so as to prevent the inverter from entering into an operation state when the main loop switch is not completely turned on, which otherwise may cause an excessively large loss of a precharge resistor. Furthermore, after the grid-connected inverter enters into a boost mode, the DC bus voltage value is gradually increased to a reference voltage value, so that while the total soft start process is completed, the power components are protected from being damaged due to an excessive start-up inrush current, thereby increasing the operation stability and reliability of the inverter.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

In order to make the description of the present disclosure more detailed and more comprehensive, various embodiments are described below with reference to the accompanying drawings. The same reference numbers are used in the drawings to refer to the same or like elements. However, those of ordinary skill in the art should understand that the embodiments described below are not used for limiting the scope of the present disclosure. Moreover, the accompanying drawings are only illustrative and are not made according to actual size.

In the embodiments and the claims of the present disclosure, descriptions indicating "coupled with" may refer to a component being indirectly connected to another component through other components, and may also refer to a component being directly connected to another component without using other components.

In the embodiments and the claims of the present disclosure, the articles "a," "an" and "the" refer to one or more, unless expressly specified otherwise.

As used herein, the terms "about," "approximately," "substantially" and "near" are used to modify any quantity that may be varied by a small amount, but these small variations do not change the nature of the quantity. In the embodiments, variations in a quantity modified by any one of the terms "about," "approximately," "substantially" or "near" is in the range of 20%, preferably in the range of 10%, and more preferably in the range of 5%, unless expressly specified otherwise.

Figure 1:
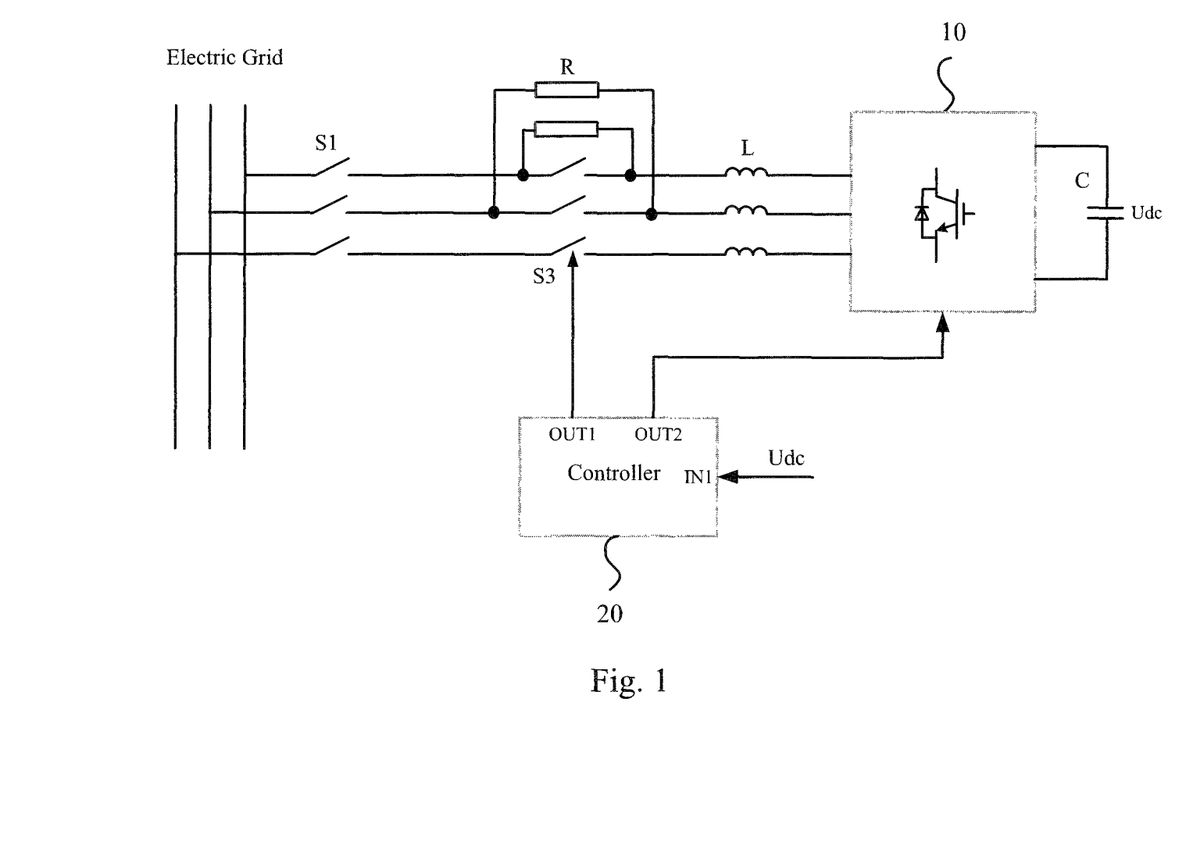
FIG. 1 illustrates a schematic circuit diagram of a starter of a grid-connected inverter according to a specific embodiment of the present disclosure.

FIG. 1 illustrates a schematic circuit diagram of a starter of a grid-connected inverter according to a specific embodiment of the present disclosure.

Referring to FIG. 1, in the present disclosure the starter of the grid-connected inverter includes a switch S3 and a resistor R (also referred to as a "precharge resistor") connected in parallel, and a controller 20. The switch S3 is coupled between an AC electric grid and a grid-connected inverter 10, and a DC voltage Udc of the grid-connected inverter 10 is detected by inspecting the voltage loaded in a capacitor C.

The controller 20 is used to control the soft start process of the inverter 10. Particularly, the controller 20 includes an input end IN1, a first output end OUT1 and a second output end OUT2. The input end IN1 receives and inspects the DC voltage Udc of the inverter 10. The first output end OUT1 is connected to the switch S3, so as to send a first control signal to turn on the switch S3. The second output end OUT2 is coupled to an inverter 10, so as to send a second control signal (e.g., a PWM enable signal) to make the inverter 10 enter into a chopping mode. The chopping mode includes a boost mode and an invert mode. For example, when the inverter 10 enters the boost mode, the AC current flows from the AC electric grid into the inverter 10, and the AC voltage is inverted into a DC voltage through the inverter 10, so that the DC voltage loaded in the DC bus capacitor C is gradually increased to a reference bus voltage value. Also for example, when the inverter 10 enters the invert mode, the inverter 10 inverts the DC voltage stored in the DC bus capacitor C into an AC voltage, so as to transmit power energy to the AC electric grid when a grid connection is realized.

It should be pointed out that, in this embodiment, when the DC voltage Udc exceeds a predetermined voltage threshold, the first output end OUT1 of the controller 20 sends the first control signal to turn on the switch S3, and subsequently the second output end OUT2 sends the second control signal to make the inverter 10 enter into the chopping mode. That is, for the controller 20 there is a delay period td1 between the send time of the first control signal and that of the second control signal, and the delay period td1 is larger than 0. In other words, the starter of the present disclosure does not send a control signal to make the inverter enter into a chopping mode at the same time that the switch S3 is turned on.

In a specific embodiment, the predetermined voltage threshold is 0.8 times the line voltage peak value of the AC electric grid. However, the present disclosure is not limited in this regard. For example, according to various performance indexes such as the circuit connection of the inverter, the type of the switching valve, the withstand voltage of the switching valve, and the charging and discharging rate of the DC bus capacitor, the quantitative relation between the predetermined voltage threshold and the line voltage peak value of the electric grid is flexibly regulated.

In another embodiment, the starter further includes a second switch (not shown in FIG. 1). The second switch is connected to the resistor R in series. In such a configuration, the controller 20 further includes a third output end, and the third output end sends a third control signal to turn on or off the second switch. For example, at the send time of the first control signal from the first output end OUT1, the second switch is still turned on based on a third control signal having a first level (such as a high level), and at the send time of the second control signal from the second output end OUT2, the second switch is turned off based on the third control signal having a second level (such as a low level). It can be seen that, in the time interval between the send time of the first control signal and the send time of the second control signal, the second switch is turned off according to the third control signal having the second level. In other words, there is a delay period td2 between the send time of the third control signal having the second level and the send time of the second control signal. The delay period td2 is a sub-period within the delay period td1, and is smaller than the delay period td1.

In a further embodiment, the starter further includes a knife switch S1 arranged between the switch S3 and the AC electric grid. To provide an example of how the knife switch S1 may be used, before the switch S3 is turned on, the knife switch S1 may be turned on manually, so that the controller 20 is used to control the turn-on time of the switch S3 and the start time of the chopping mode of the inverter, thereby realizing the soft start process of the inverter 10.

Figure 2:
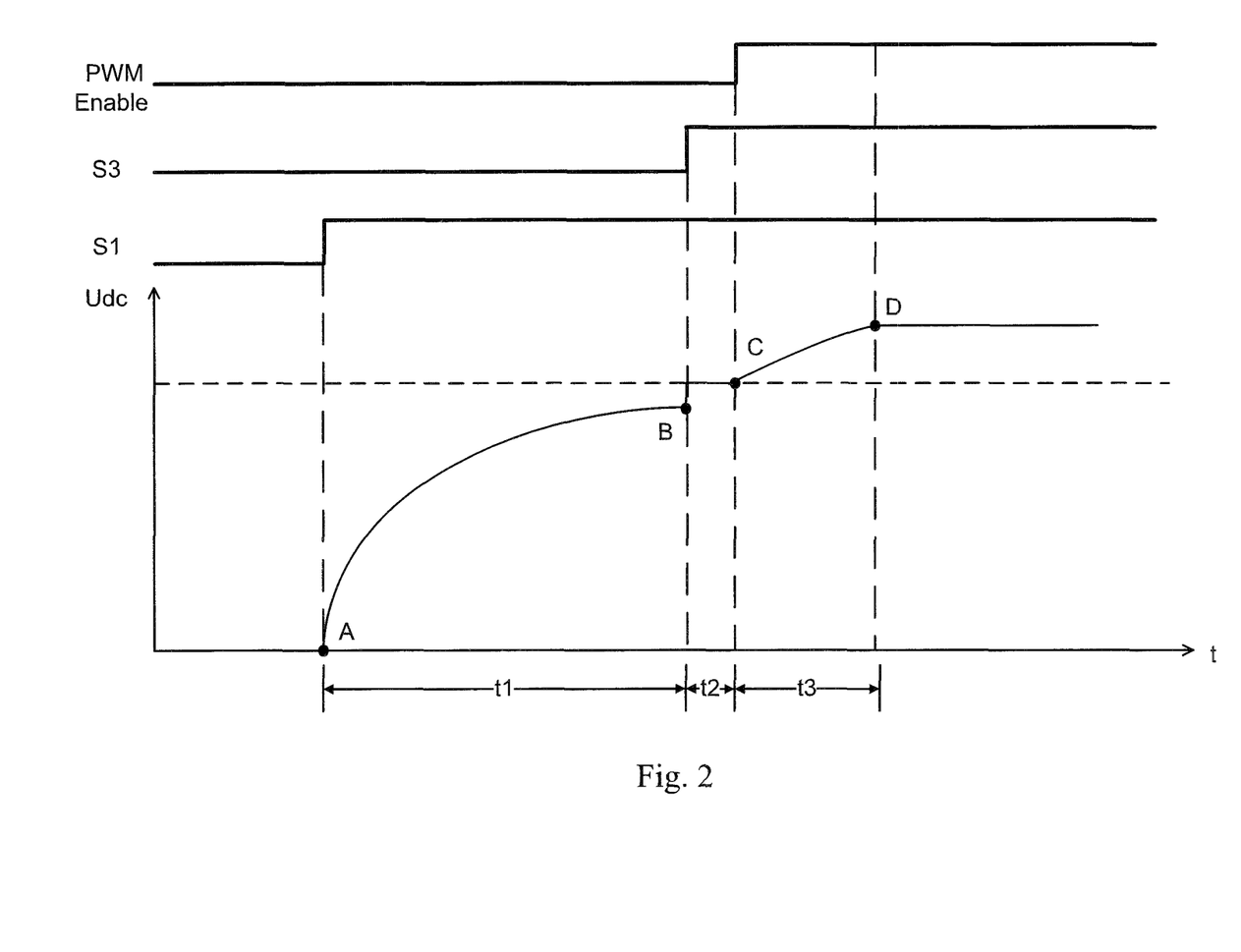
FIG. 2 illustrates a schematic view of a control signal timing and a DC voltage change curve during a soft start process of the starter of FIG. 1.

FIG. 2 illustrates a schematic view of a control signal timing and a DC voltage change curve during the soft start process of the starter of FIG. 1. Referring to FIG. 2, taking the inverter 10 operating in a boost mode as an example, according to the DC voltage loaded in the DC bus capacitor, the soft start process is divided into a precharge period (the time period t1), a soft start transition period (the time period t2) and a boost period (the time period t3).

The soft start process of the starter will now be described with reference to FIGS. 1 and 2. First, the switch S1 is turned on manually at a time corresponding to the point A of FIG. 2. Using a reverse parallel diode (such as an IGBT body diode) of the switch valve of inverter 10, the capacitor C is precharged through the precharge resistor R. At this time the DC voltage is gradually increased to the predetermined voltage threshold at a time corresponding to the point B of FIG. 2. Subsequently, the controller 20 sends a control signal to turn on the switch S3. When the switch S3 is turned on, the precharge resistor R is short-circuited. At this time, in order to prevent the inverter 10 from entering into a boost mode based on the PWM enable signal while the switch S3 is not completely turned on, from the time at which the switch S3 starts to be turned on, a time period t2, i.e., a soft start transition period is delayed, so that a sufficient time is provided to turn on the switch S3. Furthermore, the switch S3 is optimally turned on as soon as the current DC voltage value reaches a predetermined voltage threshold, because once the switch S3 is turned on after the delay, a large inrush current is generated in the circuit, which results in damage of the power components of the circuit. Finally, at the end of the time period t2, when it is determined that the switch S3 is completely turned on, the second output end OUT2 of the controller 20 sends a PWM enable signal at a time corresponding to the point C of FIG. 2 to make the inverter 10 enter into the boost mode. After the time period t3, the DC voltage is gradually increased to a designated value of the DC bus voltage at a time corresponding to the point D of FIG. 2. Thus the entire soft start process is completed.

In a specific embodiment, the voltage loaded on two ends of the switch S3 is inspected so as to determine whether the switch S3 is completely turned on. For example, when the voltage value of the switch S3 adjacent to the AC electric grid is equal to or approximately the same as that of the switch S3 adjacent to the inverter side, it is determined that the switch S3 is completely turned on, and the controller 20 sends a PWM enable signal to the inverter 10.

Figure 3:
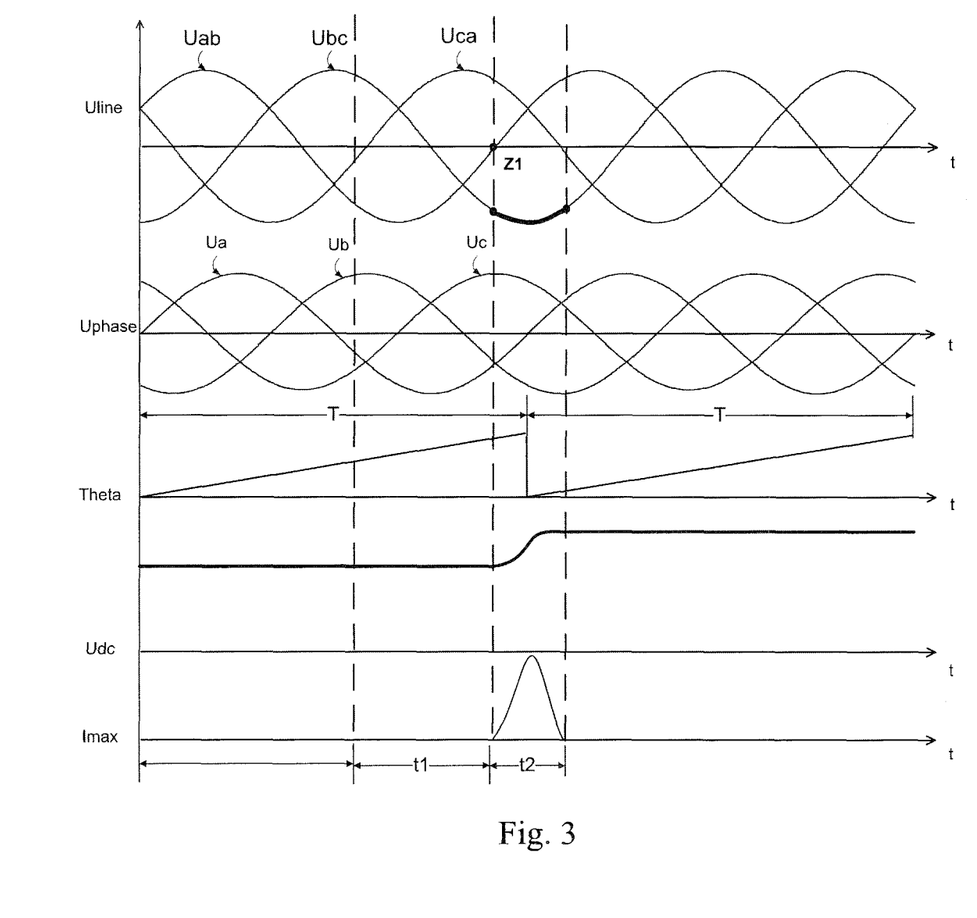
FIG. 3 illustrates a specific embodiment of the control signal timing and a send time of a first control signal of FIG. 2.

FIG. 3 illustrates a specific embodiment of the control signal timing and the send time of the first control signal of FIG. 2.

Referring to FIG. 3, Uline represents a three-phase line voltage, Uphase represents a three-phase phase voltage, Theta represents a phase-locked angle, and Imax represents an inrush current. In this embodiment, the time point corresponding to the point B of FIG. 2 (i.e., the end time of the time period t1 or the start time of the time period t2) is a time point Z1 which is the zero-crossing point of the line voltage Uab. That is, the send time of the first control signal is the zero-crossing point of the line voltage Uab. After the time period t2, i.e., at the time point corresponding to the point C of FIG. 2, the controller 20 sends the second control signal again to make the inverter 10 enter into the boost mode.

Figure 4:
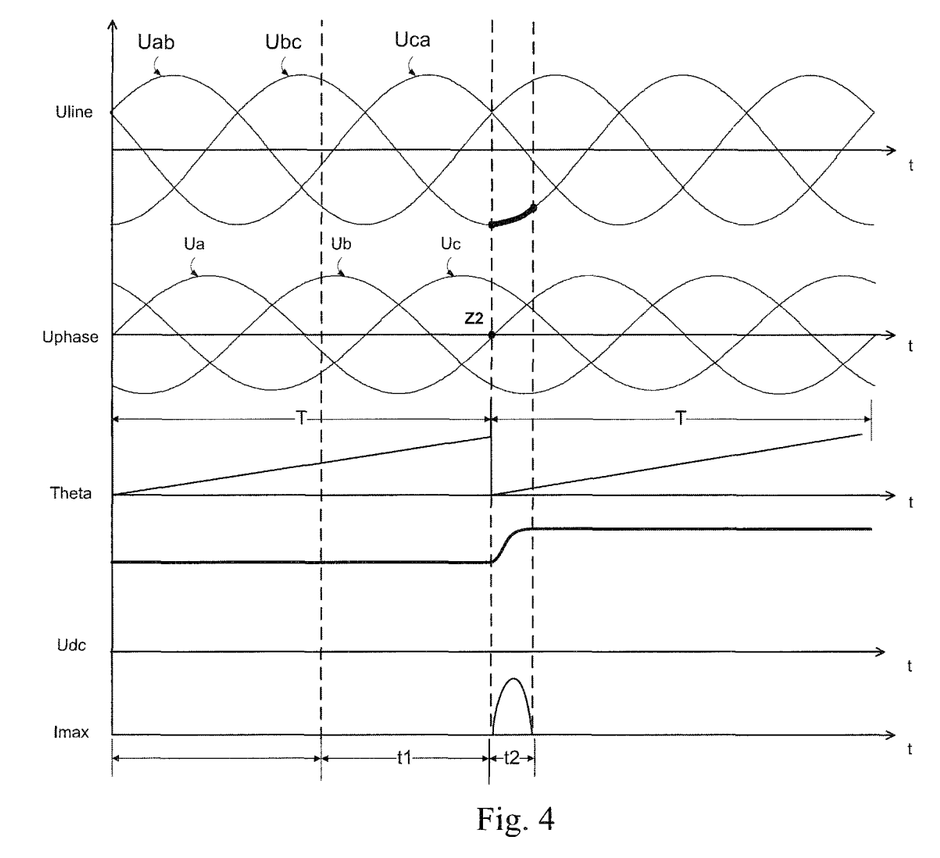
FIG. 4 illustrates another specific embodiment of the control signal timing and the send time of the first control signal of FIG. 2.

FIG. 4 illustrates another specific embodiment of the control signal timing and the send time of the first control signal of FIG. 2.

Referring to FIG. 4, Uline represents a three-phase line voltage, Uphase represents a three-phase phase voltage, Theta represents a phase-locked angle, and Imax represents an inrush current. In this embodiment, the time point corresponding to the point B of FIG. 2 (i.e., the end time of the time period t1 or the start time of the time period t2) is a time point Z2 which is the zero-crossing point of the phase voltage Ua. That is, the send time of the first control signal is the zero-crossing point of the phase voltage Ua. After the time period t2, i.e., at the time point corresponding to the point C of FIG. 2, the controller 20 sends the second control signal again to make the inverter 10 enter into the boost mode.

It should be pointed out that there is a voltage difference $\Delta U$ between the voltage (i.e., the voltage Udc corresponding to the point B of FIG. 2) reached by precharging the DC bus capacitor through the semiconductor component of the inverter and the voltage of the DC bus capacitor to be reached (i.e., the voltage Udc corresponding to the point C of FIG. 2) at the end time of the soft start transition period.

A comparison between FIGS. 3 and 4 will now be provided. In FIG. 3 at the time point Z1 which is the zero-crossing point of the line voltage Uab, the switch S3 is turned on. In FIG. 3 the bold part of the waveform of the voltage Ubc is in the largest phase. As the voltage value approaches the peak value, $\Delta U$ is gradually increased, the inrush current Imax increases at a quicker and quicker speed, and the voltage value is near the peak value for a long time period, so that the inrush current is still very large. In comparison, in FIG. 4 in order to reduce the inrush current Imax of FIG. 3, the switch S3 is turned on at the time point Z2 which is the zero-crossing point of the phase voltage Ua. For example, the zero-crossing point of the phase voltage is determined through the locked phase, so as to control the turn-on time of the switch S3. At this time the voltage loaded in the DC bus capacitor is a line voltage, the point Z2 corresponds to the peak value of the line voltage Ubc, and $\Delta U$ and the rate at which the inrush current Imax increases (at the phase having the largest current) are maximized, so that the DC voltage can be quickly increased to a high value. Subsequently the line voltage Ubc starts to decrease from the maximum point, $\Delta U$ can also be reduced to a small value in the shortest time, and the rising slope of the inrush current Imax is also reduced, so that the longest precharge time is obtained, thereby suppressing the inrush current by a maximum amount.

In a specific embodiment, the send time of the first control signal is any time in the time period from the time point T/12 before the zero-crossing point of the phase voltage of the electric grid to the time point T/12 after the zero-crossing point of the phase voltage, and T is the power frequency cycle. Furthermore, the send time of the first control signal is the zero-crossing point of the phase voltage of the electric grid, so that the DC bus capacitor obtains the longest precharge time, thereby suppressing the inrush current by a maximum amount.

In another specific embodiment, the send time of the first control signal is any time in the time period from the time point (T/12+tc) before the zero-crossing point of the phase voltage of the electric grid to the time point (T/12+tc) after the zero-crossing point of the phase voltage. T is the power frequency cycle, and tc is the operation time of the switch S3.

Figure 5:
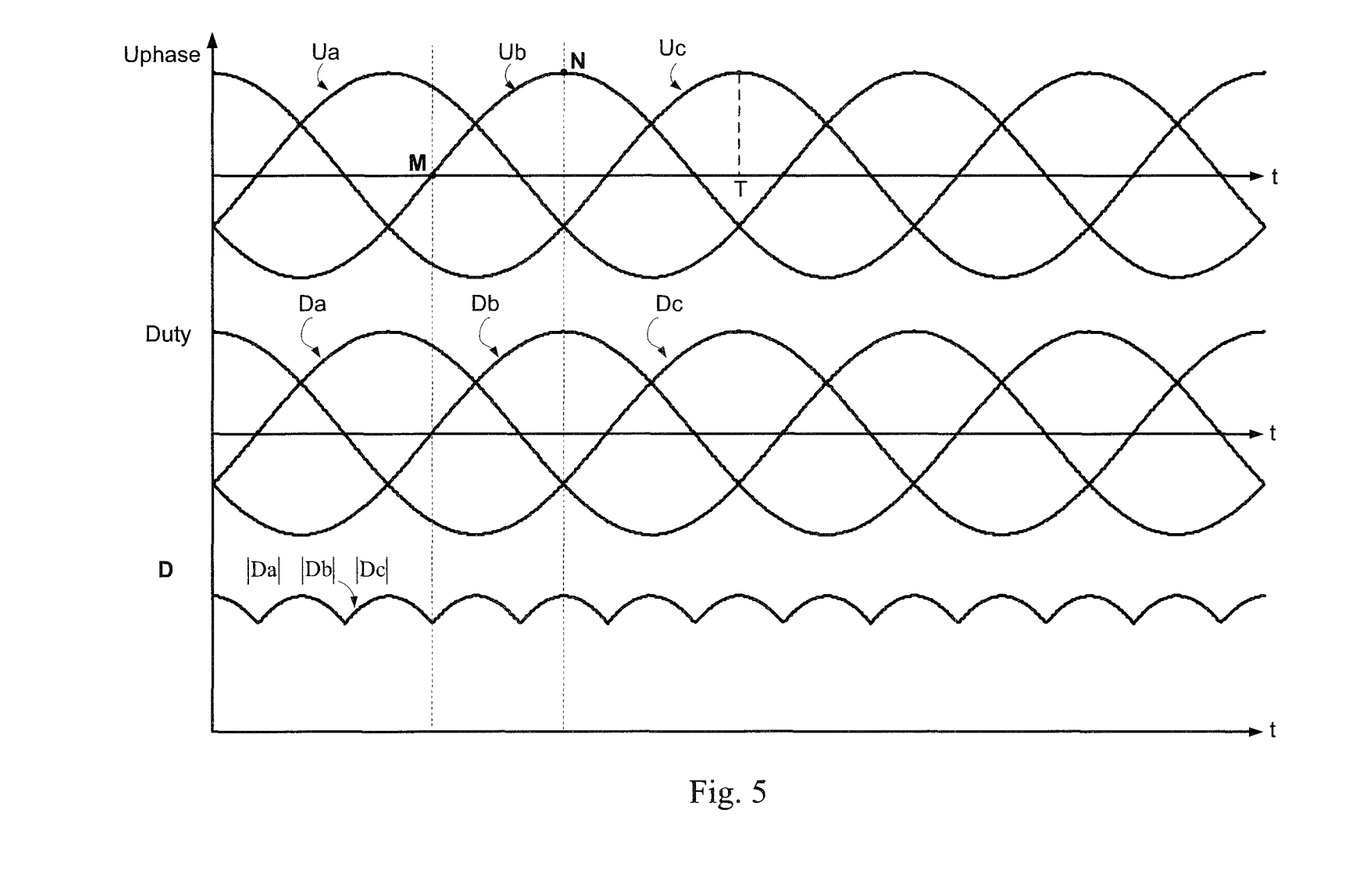
FIG. 5 illustrates a specific embodiment of the control signal timing and a send time of a second control signal of FIG. 2.

FIG. 5 illustrates a specific embodiment of the control signal timing and the send time of the second control signal of FIG. 2. Referring to FIG. 5, in this embodiment, the second control signal is a PWM enable signal, and the PWM enable signal makes the grid-connected inverter enter into the boost mode.

In this embodiment, the zero-crossing point of the phase voltage at one phase of the three-phase electric grid is determined through a phase locking segment, so that the controller 20 sends a PWM enable signal to make the inverter 10 enter into the boost mode. At this time, the duty ratio of one phase outputted by the controller 20 is gradually increased from zero, and the duty ratios of the other two phases vary according to the limiting relationship among the symmetric three phases. If the three-phase total inrush current is defined as $I_{inrush}(t)$ and the three-phase total duty ratio is defined as $D(t)$, the $I_{inrush}(t)$ and the $D(t)$ may be expressed as:

$$I_{inrush}(t)=|i_{inrush\_a}(t)|+|i_{inrush\_b}(t)|+|i_{inrush\_c}(t)|$$

$$D(t)=|D_a(t)|+|D_b(t)|+|D_c(t)|$$

where $$i_{inrush\_x}=\frac{e_x - D_x \cdot u_{dc}}{\omega L},$$

($i_{inrush\_x}$ is the inrush current of one phase, $e_x$ is the phase voltage at this phase of the electric grid, $D_x$ is the regulated duty ratio of the inverter at this phase, and $u_{dc}$ is the BUS voltage).

It can be seen from FIG. 5 that the three-phase total inrush current is proportional to the three-phase total duty ratio. At the zero-crossing point of the phase voltage (such as at the point M), the three-phase total duty ratio is minimized, so as to realize the effect of suppressing the inrush current. In an embodiment, the send time of the second control signal is any time in the time period from the time point T/24 before the zero-crossing point of the phase voltage of the electric grid to the time point T/24 after the zero-crossing point of the phase voltage, and T is the power frequency cycle. In some embodiments, the send time of the second control signal is the zero-crossing point of the phase voltage of the electric grid.

Figure 6:
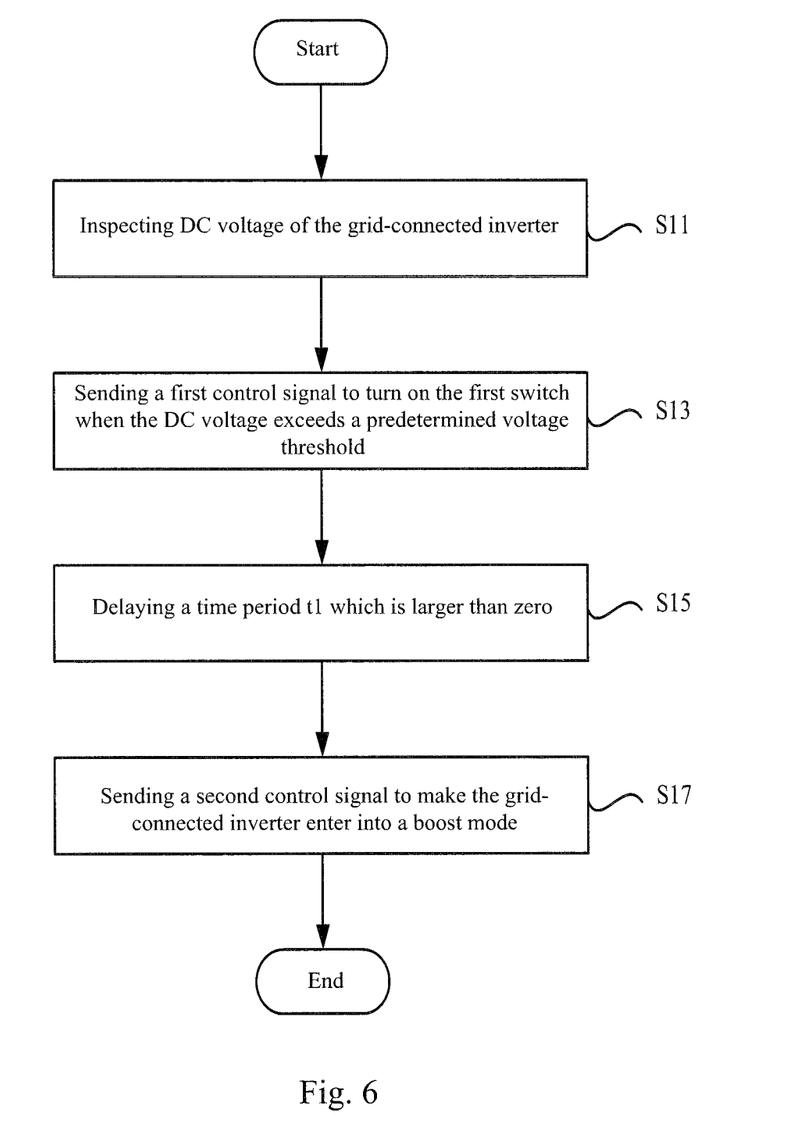
FIG. 6 illustrates a flow chart of a control method of the starter according to a specific embodiment of the present disclosure.

FIG. 6 illustrates a flow chart of a control method of the starter according to a specific embodiment of the present disclosure. The starter includes a first switch and a first resistor connected in parallel. The first switch is electrically connected between an AC electric grid and a grid-connected inverter. Referring to FIG. 6, in step S11, the DC voltage of the grid-connected inverter is detected. For example, the DC voltage loaded in the DC bus capacitor at the DC side of the inverter is inspected. Subsequently, in step S13, it is determined whether the DC voltage exceeds a predetermined voltage threshold, and when the DC voltage exceeds the predetermined voltage threshold, a first control signal is sent to turn on the first switch. Next, in step S15, a delay is performed for a time period t1 which is larger than zero, so as to ensure a sufficient operation time to completely turn on the first switch. Thus the inverter is prevented from entering the boost mode when the first switch is not completely turned on. Finally, in step S17, a second control signal is sent to make the inverter enter into the boost mode. That is there is a time interval t1 between the send time of the first control signal and the send time of the second control signal, so that the inverter enters into the boost mode only when the first switch is completely turned on.

In a specific embodiment, the send time of the second control signal is any time in the time period from the time point T/24 before the zero-crossing point of the phase voltage of the electric grid to the time point T/24 after the zero-crossing point of the phase voltage, and T is the power frequency cycle.

In another specific embodiment, the send time of the first control signal is any time in the time period from the time point T/12 before the zero-crossing point of the phase voltage of the electric grid to the time point T/12 after the zero-crossing point of the phase voltage, and T is the power frequency cycle.

Figure 7:
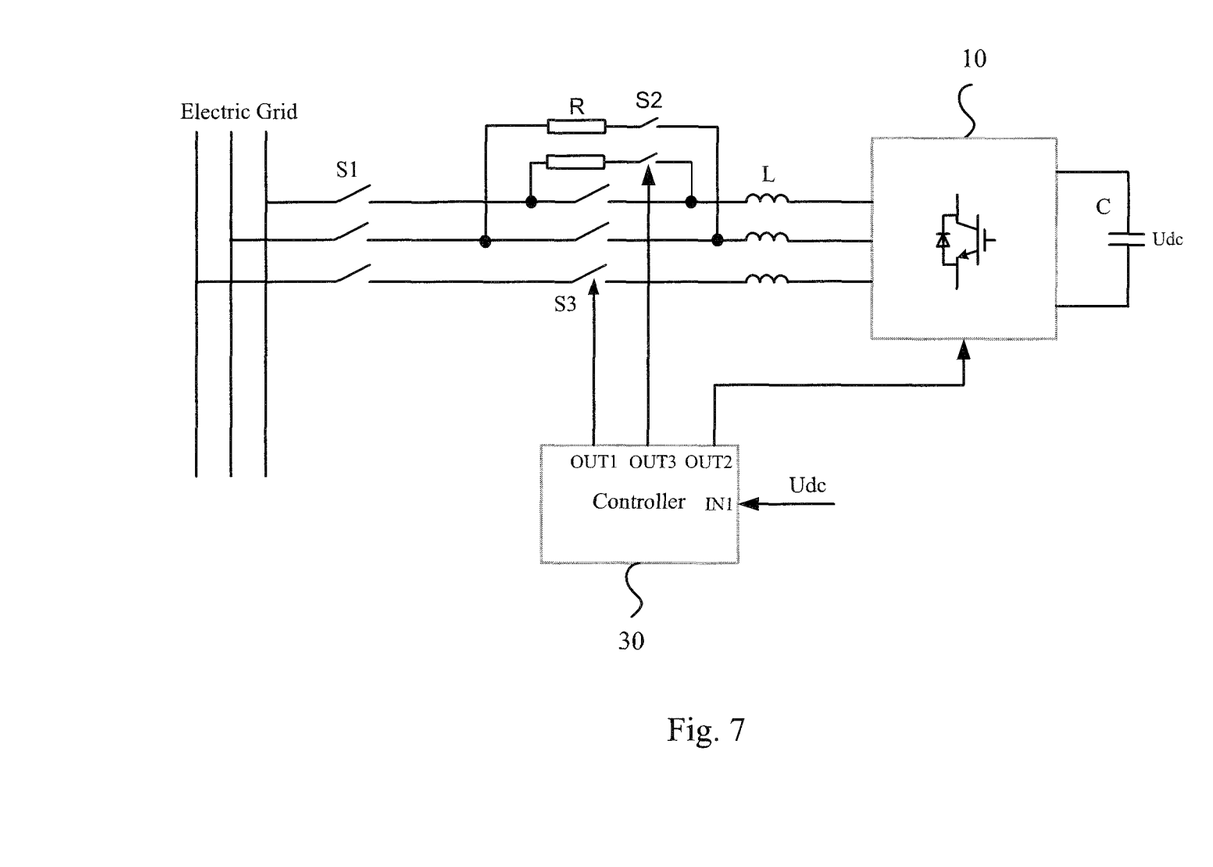
FIG. 7 illustrates a schematic circuit diagram of a starter of a grid-connected inverter according to a further specific embodiment of the present disclosure.

FIG. 7 illustrates a schematic circuit diagram of a starter of a grid-connected inverter according to still a further specific embodiment of the present disclosure.

Referring to FIG. 7, in the present disclosure the starter of the grid-connected inverter includes a switch S3, a precharge branch circuit and a controller 30. The switch S3 is coupled between an AC electric grid and a grid-connected inverter 10, and the DC voltage Udc of the grid-connected inverter 10 is detected by inspecting the voltage loaded in a capacitor C. The precharge branch circuit is connected to the switch S3 in parallel. The precharge branch circuit includes a switch S2 and a resistor R connected in series, so as to precharge the DC bus capacitor at the DC side of the inverter through the semiconductor component of the inverter.

The controller 30 is used to control the soft start process of the inverter 10. Particularly, the controller 30 includes an input end IN1, a first output end OUT1, a second output end OUT2 and a third output end OUT3. The input end IN1 receives and inspects the DC voltage Udc of the inverter 10. The first output end OUT1 is connected to the switch S3, so as to send a first control signal to turn on the switch S3. The third output end OUT3 is coupled to the switch S2, so as to send a second control signal to turn on or off the switch S2. For example, the third output end OUT3 of the controller 30 sends a second control signal having a high level to turn on the switch S2, and sends a second control signal having a low level to turn off the switch S2. In some embodiments, after the switch S2 is turned off through the second control signal outputted by the third output end OUT3, appropriate control timing is designed, and the second output end OUT2 sends a PWM enable signal to the inverter 10 to make the inverter 10 enter into the boost mode.

It should be pointed out that, in this embodiment when the DC voltage Udc exceeds a predetermined voltage threshold, the first output end OUT1 of the controller 30 sends the first control signal to turn on the switch S3, and subsequently the third output end OUT3 sends the second control signal to turn on or off the switch S2. For example, the third output end OUT3 sends a second control signal having a second level to turn on the switch S2, and sends a second control signal having a first level to turn off the switch S2. Moreover, there is a delay period t3 between the send time of the second control signal having the first level and the send time of the first control signal, and the delay period t3 is larger than 0. In other words, the starter of the present disclosure sends the second control signal to turn off the switch S2 of the precharge branch circuit after the switch S3 is completely turned on (after the delay period t3), rather than sending the second control signal to turn off the switch S2 to make the inverter enter into a chopping mode at the time that the switch S3 is turned on.

In a specific embodiment, the predetermined voltage threshold is 0.8 times the line voltage peak value of the AC electric grid. However, the present disclosure is not limited in this regard. For example, according to various performance indexes such as the circuit connection of the inverter, the type of the switching valve, the withstand voltage of the switching valve, and the charging and discharging rate of the DC bus capacitor, the quantitative relation between the predetermined voltage threshold and the line voltage peak value of the electric grid is flexibly regulated.

In a further embodiment, the starter further includes a knife switch S1 arranged between the switch S3 and the AC electric grid. To provide an example of how the knife switch may be used, before the switch S3 is turned on, the knife switch S1 may be turned on manually, so as to control the turn-on time of the switch S3 and the turn-on and off time of the switch S2 through the controller 30.

Figure 8:
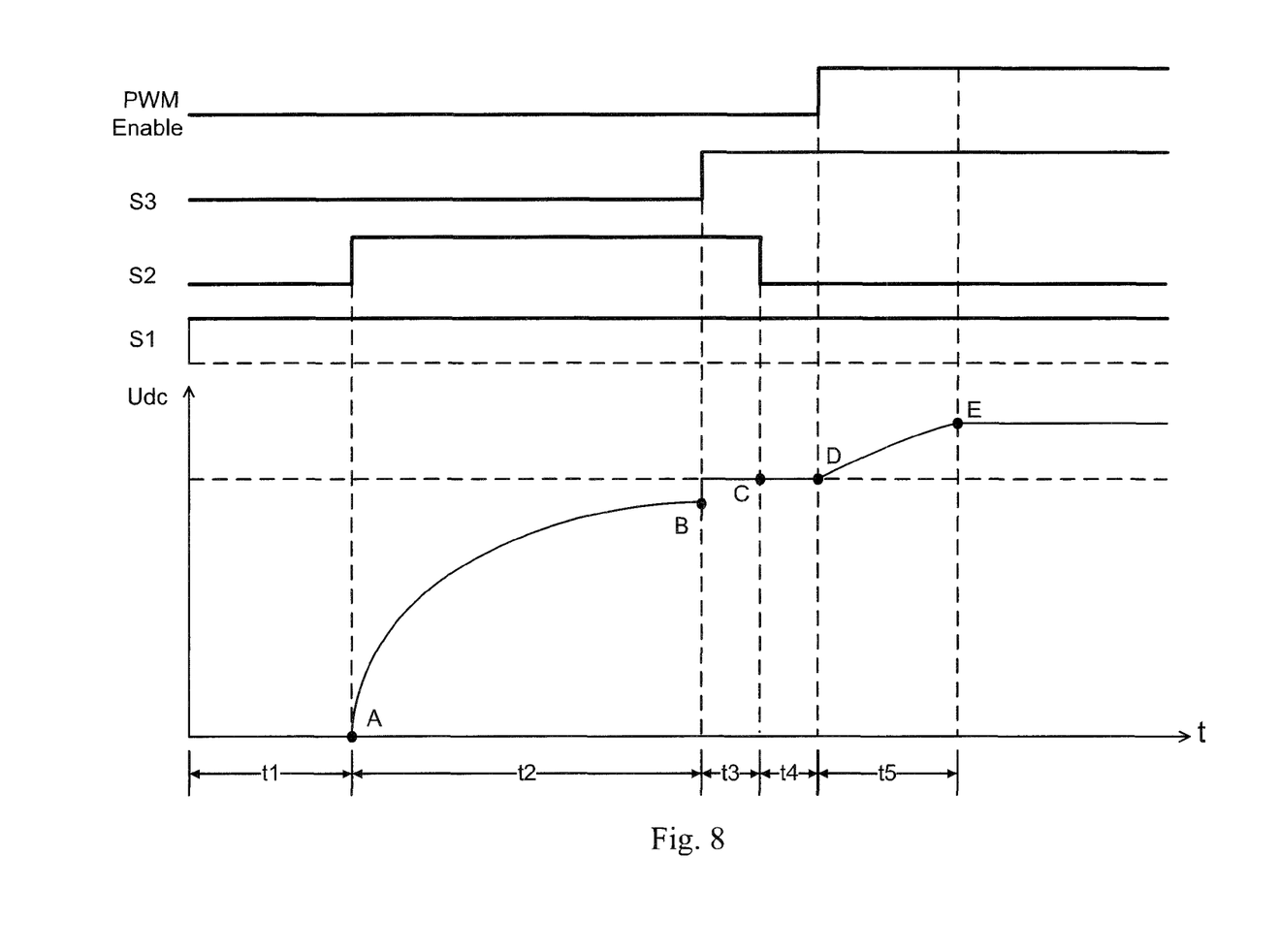
FIG. 8 illustrates a schematic view of a control signal timing and a DC voltage change curve during a soft start process of the starter of FIG. 7.

FIG. 8 illustrates a schematic view of a control signal timing and a DC voltage change curve during a soft start process of the starter of FIG. 7. Referring to FIG. 8, taking the inverter 10 operating in a boost mode as an example, according to the DC voltage loaded in the DC bus capacitor, the soft start process is divided into a precharge period (the time period t2), a soft start transition period (the time period t3+t4) and a boost period (the time period t5).

The soft start process of the starter will now be described with reference to FIGS. 7 and 8. First, the switch S1 is turned on manually at a time corresponding to the point A of FIG. 8. Using a reverse parallel diode (such as an IGBT body diode) of the switch valve of inverter 10, the capacitor C is precharged through the precharge resistor R. At this time the DC voltage is gradually increased to the predetermined voltage threshold at a time corresponding to the point B of FIG. 8. Subsequently, the controller 30 sends a control signal to turn on the switch S3. After the switch S3 is turned on, the precharge branch circuit is short-circuited. At this time, in order to ensure a sufficient operation time to completely turn on the switch S3, a delay is performed for a time period t3 from the turn-on time of the switch S3, so as to ensure the normal start of the main circuit and prevent the switches S2 and S3 from being turned off simultaneously. Next, the controller 30 sends a second control signal to turn off the switch S2 at a time corresponding to the point C of FIG. 8, and a delay is performed for a time period t4 to ensure a sufficient time for completely turning off the switch S2. Finally, the second output end OUT2 of the controller 30 sends a PWM enable signal at a time corresponding to the point D of FIG. 8 to make the inverter 10 enter into a boost mode, and through a time period t5 the DC voltage is gradually increased to a designated value of the DC bus voltage at a time corresponding to the point E of FIG. 8.

In a specific embodiment, the voltage loaded on two ends of the switch S3 is inspected so as to determine whether the switch S3 is completely turned on. For example, when the voltage value of the switch S3 adjacent to the AC electric grid is equal to or approximately the same as that of the switch S3 adjacent to the inverter side, it is determined that the switch S3 is completely turned on, and the controller 30 sends a PWM enable signal to the inverter 10.

In a specific embodiment, at the send time of the first control signal outputted by the first output end OUT1, the switch S2 is still turned on based on the second control signal having a second level. For example, when having a low level the second control signal is used to turn off the switch S2, and when having a high level the second control signal is used to turn off the switch S2.

In a specific embodiment, the send time of the first control signal is any time in the time period from the time point T/12 before the zero-crossing point of the phase voltage of the electric grid to the time point T/12 after the zero-crossing point of the phase voltage, and T is the power frequency cycle. Furthermore, the send time of the first control signal is the zero-crossing point of the phase voltage of the electric grid, so that the DC bus capacitor obtains the longest precharge time, thereby suppressing the inrush current by a maximum amount.

In another specific embodiment, the send time of the first control signal is any time in the time period from the time point (T/12+tc) before the zero-crossing point of the phase voltage of the electric grid to the time point (T/12+tc) after the zero-crossing point of the phase voltage. T is the power frequency cycle, and tc is the operation time of the switch S3.

Figure 9:
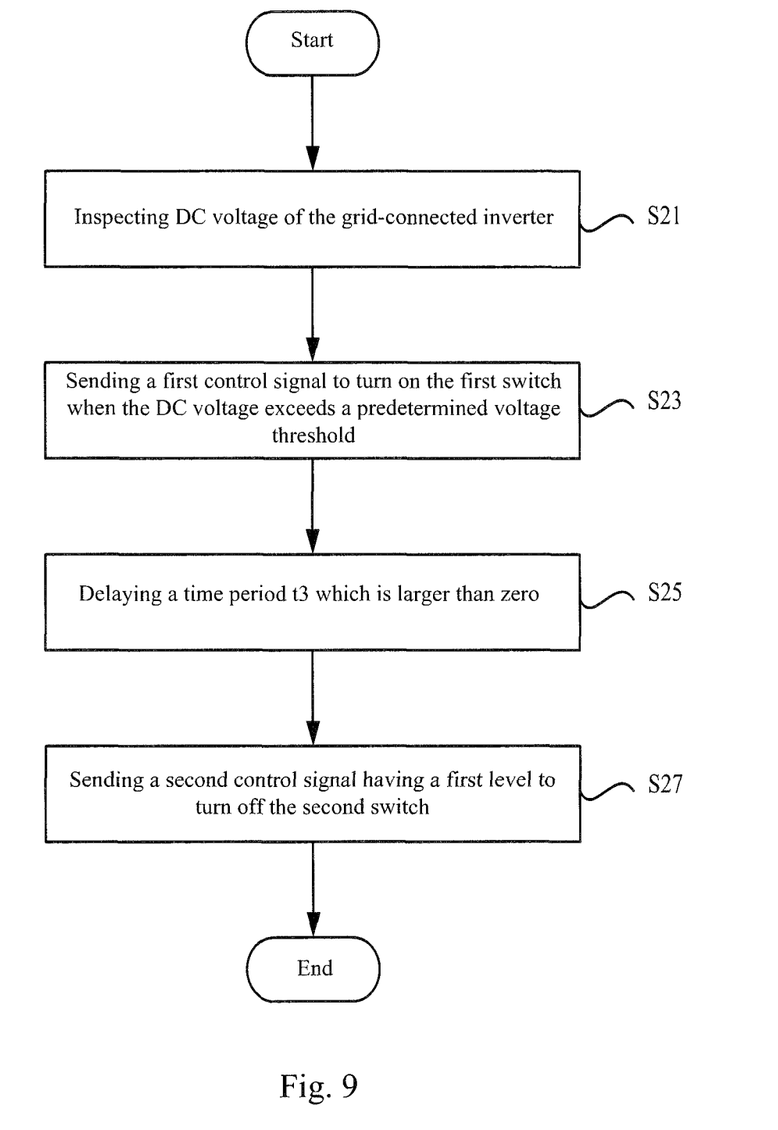
FIG. 9 illustrates a flow chart of a control method of the starter according to still a further specific embodiment of the present disclosure.

FIG. 9 illustrates a flow chart of a control method of the starter according to a further specific embodiment of the present disclosure. The starter includes a first switch and a precharge branch circuit connected in parallel. The first switch is electrically connected between an AC electric grid and the grid-connected inverter. The precharge branch circuit includes a second switch and a first resistor connected in series. Referring to FIG. 9, in step S21, the DC voltage of the grid-connected inverter is detected. For example, the DC voltage loaded in the DC bus capacitor at the DC side of the inverter is inspected. Subsequently, in step S23, it is determined whether the DC voltage exceeds a predetermined voltage threshold, and when the DC voltage exceeds the predetermined voltage threshold, a first control signal is sent to turn on the first switch. Next, in step S25, a delay is performed for a time period td4 which is larger than zero, so as to ensure a sufficient operation time to completely turn on the first switch. Finally, in step S27, a second control signal having the first level is sent to turn off the second switch.

In a specific embodiment, before the step S23, the control method further includes sending a second control signal having a second level to turn on the second switch so that the DC bus capacitor at the DC side of the inverter is in a precharge state. For example, before the switch S3 is turned on, the third output end OUT3 of the controller 30 sends a second control signal having a high level to turn on the switch S2, so as to recharge the DC bus capacitor C at the DC side of the inverter through the resistor R of the precharge branch circuit and the semiconductor component of the inverter.

In another specific embodiment, the send time of the first control signal is any time in the time period from the time point T/12 before the zero-crossing point of the phase voltage of the electric grid to the time point T/12 after the zero-crossing point of the phase voltage, and T is the power frequency cycle. Furthermore, the send time of the first control signal is the zero-crossing point of the phase voltage of the electric grid.

By adopting the starter of the grid-connected inverter and the control method thereof, the controller of the starter sends a first control signal to turn on a main loop switch, and after a delay period the controller sends a second control signal to make the grid-connected inverter enter into a chopping mode, so as to prevent the inverter from entering into an operation state when the main loop switch is not completely turned on, which otherwise may cause an excessively large loss of a precharge resistor. Furthermore, after the grid-connected inverter enters the boost mode, the DC bus voltage is gradually increased to the reference voltage value, so that while the total soft start process is completed, the power components are protected from being damaged due to an excessive start-up inrush current, thereby increasing the operation stability and reliability of the inverter.

Although the present disclosure has been disclosed with reference to the above embodiments, these embodiments are not intended to limit the present disclosure. It will be apparent to those of skills in the art that various modifications and variations can be made without departing from the spirit and scope of the present disclosure. Therefore, the scope of the present disclosure shall be defined by the appended claims.

What is claimed is:

1. A starter of a grid-connected inverter, comprising a first switch and a first resistor connected in parallel, wherein the first switch is electrically connected between an AC electric grid and a grid-connected inverter, and the starter further comprises:
   a controller comprising an input end, a first output end and a second output end, wherein the input end of the controller receives and inspects the DC voltage signal of the inverter, and when the DC voltage exceeds a predetermined voltage threshold, the first output end of the controller sends a first control signal to turn on the first switch, and the second output end outputs a second control signal to make the grid-connected inverter enter into a chopping mode,
   wherein there is a delay period td1 between the send time of the first control signal and the send time of the second control signal, and td1 is larger than 0.

2. The starter of claim 1, wherein the second control signal is a PWM enable signal and the PWM enable signal makes the grid-connected inverter enter into the boost mode.

3. The starter of claim 2, wherein the send time of the second control signal is any time in the time period from the time point T/24 before the zero-crossing point of the phase voltage of the electric grid to the time point T/24 after the zero-crossing point of the phase voltage, and T is the power frequency cycle.

4. The starter of claim 3, wherein the send time of the second control signal is the zero-crossing point of the phase voltage of the electric grid.

5. The starter of claim 1, wherein the starter further comprises a second switch connected in series with the first resistor, and the controller further comprises a third output end, and the third output end outputs a third control signal to turn on or off the second switch.

6. The starter of claim 5, wherein at the send time of the first control signal, the second switch is still turned on based on the third control signal, and at the send time of the second control signal, the second switch is turned off based on the third control signal.

7. The starter of claim 6, wherein there is a delay period td2 between the send time of the third control signal having the second level and the send time of the second control signal, and td2 is larger than zero and smaller than td1.

8. The starter of claim 1, wherein the send time of the first control signal is any time in the time period from the time point T/12 before the zero-crossing point of the phase voltage of the electric grid to the time point T/12 after the zero-crossing point of the phase voltage, and T is the power frequency cycle.

9. The starter of claim 8, wherein the send time of the first control signal is the zero-crossing point of the phase voltage of the electric grid.

10. The starter of claim 1, wherein the send time of the first control signal is any time in the time period from the time point (T/12+tc) before the zero-crossing point of the phase voltage of the electric grid to the time point (T/12+tc) after the zero-crossing point of the phase voltage, and T is the power frequency cycle.

11. The starter of claim 1, wherein the starter further comprises a knife switch arranged between the first switch and the AC electric grid.

12. The starter of claim 1, wherein the predetermined voltage threshold is 0.8 times the line voltage peak value of the AC electric grid.

13. A starter of a grid-connected inverter, comprising:
    a first switch electrically connected between an AC electric grid and the grid-connected inverter;
    a precharge branch circuit connected with the first switch in parallel, wherein the precharge branch circuit comprises a second switch and a first resistor connected in series; and
    a controller comprising an input end, a first output end and a second output end, wherein the input end of the controller receives and inspects the DC voltage signal of the inverter, and when the DC voltage exceeds a predetermined voltage threshold, the first output end of the controller sends a first control signal to turn on the first switch, and the second output end outputs a second control signal to turn on or off the second switch,
    wherein there is a delay period td3 between the send time of the second control signal having a first level and the send time of the first control signal, and td3 is larger than 0.

14. The starter of claim 13, wherein at the send time of the first control signal, the second switch is still turned on based on the second control signal having a second level.

15. The starter of claim 13, wherein the first level is a low level used for turning off the second switch, and the second level is a high level used for turning on the second switch.

16. The starter of claim 13, wherein the send time of the first control signal is any time in the time period from the time point T/12 before the zero-crossing point of the phase voltage of the electric grid to the time point T/12 after the zero-crossing point of the phase voltage, and T is the power frequency cycle.

17. The starter of claim 16, wherein the send time of the first control signal is the zero-crossing point of the phase voltage of the electric grid.

18. The starter of claim 13, wherein the send time of the first control signal is any time in the time period from the time point (T/12+tc) before the zero-crossing point of the phase voltage of the electric grid to the time point (T/12+tc) after the zero-crossing point of the phase voltage, and T is the power frequency cycle.

19. The starter of claim 13, wherein the predetermined voltage threshold is 0.8 times the line voltage peak value of the AC electric grid.

20. A control method of a starter, wherein the starter comprises a first switch and a first resistor connected in parallel, and the first switch is electrically connected between an AC electric grid and a grid-connected inverter, and the control method comprises:
    a) inspecting a DC voltage of the grid-connected inverter;
    b) sending a first control signal to turn on the first switch when the DC voltage exceeds a predetermined voltage threshold;
    c) performing a delay for a time period td1 which is larger than zero;
    d) sending a second control signal to make the grid-connected inverter enter into a boost mode.

21. The control method of claim 20, wherein the time period td1 is not smaller than the operation time used for completely turning on the first switch.

22. The control method of claim 20, wherein the send time of the second control signal is any time in the time period from the time point T/24 before the zero-crossing point of the phase voltage of the electric grid to the time point T/24 after the zero-crossing point of the phase voltage, and T is the power frequency cycle.

23. The control method of claim 20, wherein the send time of the first control signal is any time in the time period from the time point T/12 before the zero-crossing point of the phase voltage of the electric grid to the time point T/12 after the zero-crossing point of the phase voltage, and T is the power frequency cycle.

24. The control method of claim 20, wherein the predetermined voltage threshold is 0.8 times the line voltage peak value of the AC electric grid.

25. A control method of a starter, wherein the starter comprises a first switch and a precharge branch circuit connected in parallel, the first switch is electrically connected between an AC electric grid and a grid-connected inverter, the precharge branch circuit comprises a second switch and a first resistor connected in series, and the control method comprises:
    a) inspecting a DC voltage of the grid-connected inverter;
    b) sending a first control signal to turn on the first switch when the DC voltage exceeds a predetermined voltage threshold;
    c) performing a delay for a time period td4 which is larger than zero;
    d) sending a second control signal having a first level to turn off the second switch.

26. The control method of claim 25, wherein before the step b the control method further comprises:
    sending a second control signal having a second level to turn on the second switch, so that a DC bus capacitor at the DC side of the inverter is in a precharge state.

27. The control method of claim 25, wherein the send time of the first control signal is any time in the time period from the time point T/12 before the zero-crossing point of the phase voltage of the electric grid to the time point T/12 after the zero-crossing point of the phase voltage, and T is the power frequency cycle.

28. The control method of claim 25, wherein the predetermined voltage threshold is 0.8 times the line voltage peak value of the AC electric grid.

* * * * *